(12) United States Patent
Igura

(10) Patent No.: US 6,757,813 B1
(45) Date of Patent: Jun. 29, 2004

(54) PROCESSOR

(75) Inventor: Hiroyuki Igura, Tokyo (JP)

(73) Assignee: NEC Corporation (JP)

( * ) Notice: Subject to any disclaimer, the term of this patent is extended or adjusted under 35 U.S.C. 154(b) by 613 days.

(21) Appl. No.: 09/602,057

(22) Filed: Jun. 23, 2000

(30) Foreign Application Priority Data

Jun. 24, 1999 (JP) ............................................ 11-177838

(51) Int. Cl.$^7$ ............................ G06F 9/30; G06F 9/305; G06F 7/38
(52) U.S. Cl. .................. 712/226; 712/24; 712/217; 712/219; 712/221; 712/43; 712/223; 711/125; 711/172; 708/501
(58) Field of Search ........................ 712/23, 217, 219, 712/300, 226, 221, 248, 216, 43, 210, 24, 223; 708/650, 653, 233, 236, 523, 501; 711/171, 172, 125, 143

(56) References Cited

U.S. PATENT DOCUMENTS 5,404,470 A * 4/1995 Miyake ........................ 712/217
5,442,581 A * 8/1995 Poland ........................ 708/653
5,881,307 A * 3/1999 Park et al. .................... 712/23

FOREIGN PATENT DOCUMENTS

| JP | 04-109336 | 10/1992 | |
|----|-----------|---------|--|
| JP | 2874351 | 1/1999 | ............ G06F/9/38 |

OTHER PUBLICATIONS

Gwennap, L., "VLIW: The Wave of the Future?", Microprocessor Report, vol. 8, No. 2, Feb. 1994 pps 18–21.

* cited by examiner

Primary Examiner—Daniel H. Pan
(74) Attorney, Agent, or Firm—Hayes Soloway P.C.

(57) ABSTRACT

In a processor executing plural instructions simultaneously, writin-destination-register numbers of the plural instructions to be executed simultaneously are compared, and kinds of operations to be executed by the plural instructions are changed in response to a comparison result. When the writing-destination-register numbers of the plural instructions are identical, a constant operation is applied to plural operation results obtained from the plural instructions to obtain an operation result and the operation result is written into the writing-destination-register instructed by the plural instructions. Results outputted from plural processing units are put together into one result and the result is stored in one register. Thus, register use efficiency and process efficiency are improved.

6 Claims, 11 Drawing Sheets

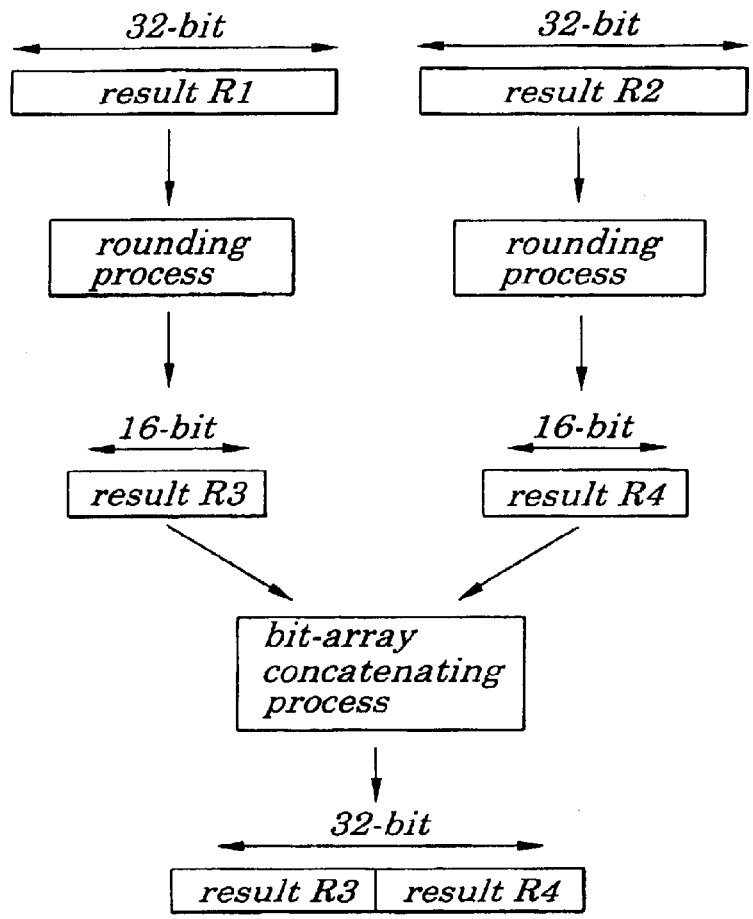
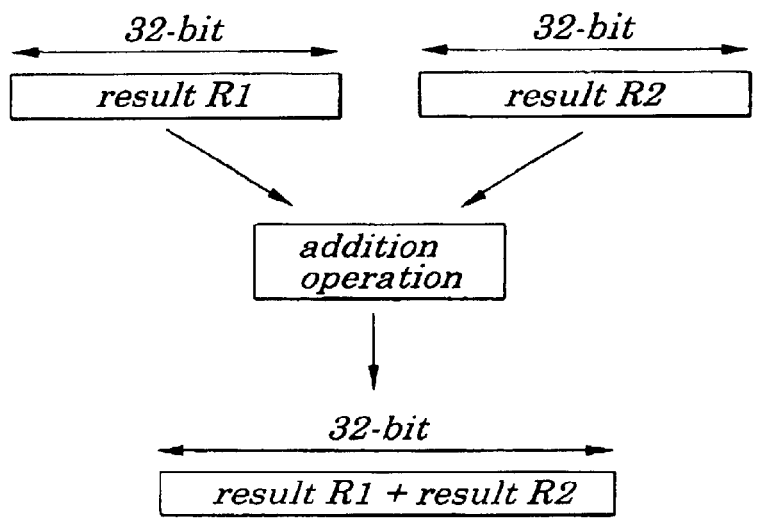

FIG.8

| writing destination of instruction code 1 | writing destination of instruction code 2 | contents written in registers 9 | contents written in registers 10 |
|---|---|---|---|
| not write | not write | not written | not written |
| | register 9 | result of processing unit 6 | not written |
| | register 10 | not written | result of processing unit 6 |
| register 9 | not write | result of processing unit 5 | not written |
| | register 9 | result of processing unit 12 | not written |
| | register 10 | result of processing unit 5 | result of processing unit 6 |
| register 10 | not write | not written | result of processing unit 5 |
| | register 9 | result of processing unit 6 | result of processing unit 5 |
| | register 10 | not written | result of processing unit 12 |

FIG.13(PRIOR ART)

| writing destination of instruction code 1 | writing destination of instruction code 2 | contents written into registers 9 | contents written into registers 10 |
|---|---|---|---|
| not write | not write | not written | not written |
| | register 9 | result of processing unit 6 | not written |
| | register 10 | not written | result of processing unit 6 |
| register 9 | not write | result of processing unit 5 | not written |
| | register 9 | result of processing unit 5 | not written |
| | register 10 | result of processing unit 5 | result of processing unit 6 |
| register 10 | not write | result of processing unit 5 | result of processing unit 5 |
| | register 9 | result of processing unit 6 | result of processing unit 5 |
| | register 10 | not written | result of processing unit 5 |

PROCESSOR

BACKGROUND OF THE INVENTION

1. Field of the Invention

The present invention relates to a processor and more particularly to the processor capable of executing plural instructions simultaneously.

2. Description of the Related Art

Conventionally, various ideas are proposed for parallel processors executing plural instructions simultaneously to improve performance of processors.

One of the ideas, a VLIW (Very Long Instruction Word), has been proposed. In this idea, a program includes information indicating instructions which can be executed simultaneously, so as to reduce complications of instruction decoders. For example, a VLIW processor is explained in pages 18 through 21, MICROPROCESSOR REPORT Vol. 8, No. 2, Feb. 14, 1994.

In parallel processors executing plural instructions simultaneously, i.e., a VLIW processor, plural instructions to be executed simultaneously are processed independently. For example, Laid-open Japanese Patent Application No. Hei4-238537 shows in FIG. 6 a processor that is independently prepared for each of the instructions simultaneously processed.

In this processor, when a register is designated as storage for plural operation results obtained by independent-plural processing units, conventionally, one of the following procedures is applied: one of the operation results is given top priority to be stored in the registers; and either another operation result is delayed from being written in the register or making codes designating the register in duplication is prohibited.

FIG. 14 shows registers into which operation results are written in a conventional parallel processor or a like processor executing plural instructions.

An instruction code 1 is decoded by a decoder 3 and drives processing unit 5. Operation results of the processing unit 5 and a processing unit 6 are respectively selected by a selector 7 and a selector 8 and are respectively written in a register 9 and a register 10.

In this case, when an operation result by the processing unit is designated to be written in the register 9 as a decoded result of the instruction code 1 by the decoder 3, the selector 7 selects the operation result of the processing unit 5.

Similarly, when an operation result by the processing unit 6 is designated to be written in the register 9 as a decoded result of an instruction code 2 by a decoder 4, the selector 7 selects the operation result of the processing unit 6. When two results are designated to be written in one register as the decoded results of the decoder 3 and the decoder 4, for example, when both results are designated to be written in the register 9, it is designed that only one of the results is written in the register 9, or it is designed that neither results are written in the resister 9.

FIG. 11 is a case in that the result of the processing unit 5 is written into the register 9 and the result of the processing unit 6 is written in the register 10. In this case, writing destination registers are different.

FIG. 12 shows an action in the processor when writing-destination-registers are identical. In this case, priority is given to one result of the processing unit 5 or the processing unit 6 and only one result is written. In FIG. 12, the result of the processing unit 5 is written in the register 9 and the result of the processing unit 6 is discarded FIG. 13 is a table showing example contents to be written in the registers 9 and the register 10 according to writing destination instructions of the instruction code 1 and the instruction code 2. In this case, priority is given to result writing instructed by the instruction code 1 over result writing instructed by the instruction code 2.

However, there are problems in the above-described conventional processor.

A first problem is that the use efficiency of the registers degrades.

To perform operation processes efficiently, in executing plural operations simultaneously, when one register is designated as operation result writing destinations, only one result is written, or, neither results are written. That is why it is necessary to describe codes in a manner such that the results of instructions to be executed simultaneously are written in respective registers. In this case, though a necessary bit-accuracy is smaller than a bit-width of a register (for example, smaller than half of the bit-width) and all operation results are stored in one register, an identical number of both registers and number of operations are required.

Another problem is that processing efficiency degrades.

When plural operation results written in plural registers are stored in a memory, it is necessary to store plural register contents in the memory. As a result, contents are stored in the memory with a memory storing instruction thereby increasing the number of instructions, and processing efficiency decreases.

SUMMARY OF THE INVENTION

In view of the above it is an object of the present invention to provide a processor capable of improving processing efficiency by increasing use efficiency of registers and thereby storage process to a memory decreases.

According to a first aspect of the present invention, there is provided a processor executing plural instructions simultaneously, wherein register numbers of the plural instructions to be executed simultaneously are compared, kinds of operations to be executed by the plural instructions are changed in response to a comparison result.

In the foregoing, a preferable mode is one wherein the register numbers to be compared are writing-destination-register numbers.

Also, a preferable mode is one wherein when the writing-destination-register numbers of the plural instructions to be executed simultaneously are identical, a constant operation is applied to plural operation results obtained from the plural instructions to obtain an operation result and the operation result is written into a writing-destination-register instructed by the plural instructions.

Also, a preferable mode is one wherein the operation result is obtained by concatenating plural parts of the plural operation results.

Also, a preferable mode is one wherein the operation result is obtained by rounding the plural operation results and concatenating plural parts of plural rounded operation results.

Also, a preferable mode is one wherein the operation result is obtained by adding the plural operation results.

Also, a preferable mode is one wherein the operation result is obtained by logical summing of the plural operation results.

Also, a preferable mode is one wherein the operation result is obtained by logical multiplying of the plural operation results.

With the above configuration, plural operation results outputted from plural processing units executing processes simultaneously are put together into one result and the result is stored in one register. Consequently, since a number of registers required to be stored with operation results decreases, a register use efficiency can be improved. Further, when results are written into a memory, a number of storing instructions can be reduced compared to plural values in registers. As a result, process efficiency can be improved.

According to a second aspect of the present invention, there is provided a processor executing plural instructions simultaneously, the processor including a comparison part for comparing register numbers of the plural instructions to be executed simultaneously, and a changing part for changing kinds of operations to be executed by the plural instructions in response to a comparison result of the comparison part.

In the foregoing second aspect, the comparison part may be a register check circuit, and the changing part may be a processing unit and/or a selector.

BRIEF DESCRIPTION OF THE DRAWINGS

The above and other objects, advantages, and features of the present invention will be more apparent from the following description taken in conjunction with the accompanying drawings in which:

FIG. 3 is a flowchart showing a second operation sample of the processing unit 12;

FIG. 4 is a flowchart showing a third operation sample of the processing unit 12;

FIG. 8 is a table showing a relationship between writing-destination-registers and actually-written-values in the processor according to the first embodiment of the present invention;

FIG. 13 is a table showing a relationship between writing-destination-registers and actually-written-values in a conventional processor.

DETAILED DESCRIPTION OF THE PREFERRED EMBODIMENTS

Best modes for carrying out the present invention will be described in further detail using various embodiments with reference to the accompanying drawings.

First Embodiment

Figure 1:
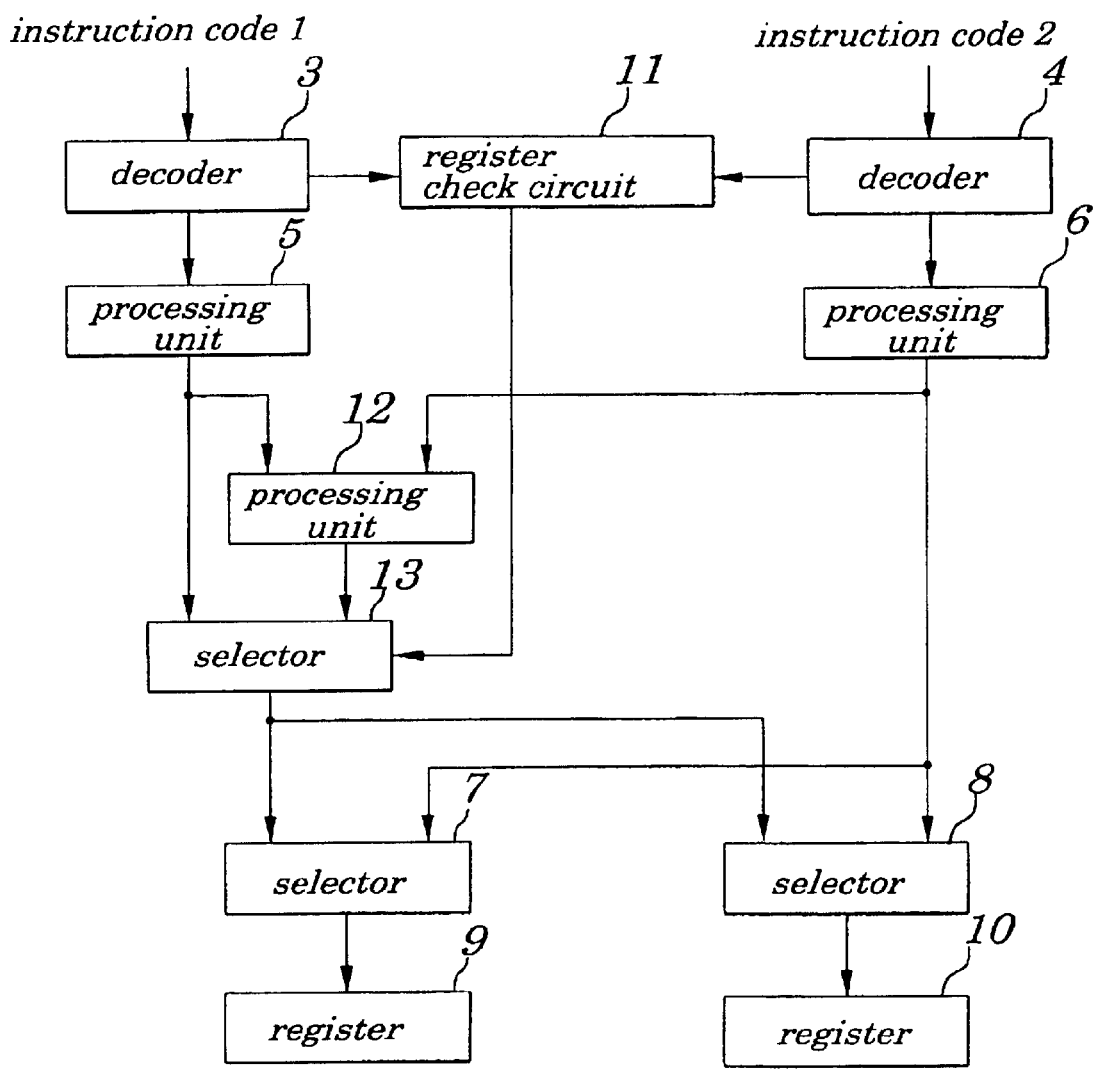
FIG. 1 is a block diagram showing a processor according to a first embodiment of the present invention.

FIG. 1 is a block diagram showing a processor of the first embodiment of the present invention.

As shown in FIG. 1, the processor of the first embodiment includes a decoder 3 analyzing an instruction code 1 and a decoder 4 analyzing instruction code 2, a processing unit 5 and a processing unit 6, a selector 7 and a selector 8, and registers 9 and 10 for storing the results of the processing units 5 and the processing unit 6.

Moreover, the processor includes a register check circuit 11 for comparing a writing destination register number outputted from the decoder 3 and a writing destination register number outputted from the decoder 4 and for outputting a coincidence signal when these register numbers are coincident, a processing unit 12 for processing the results of the processing unit 5 and the processing unit 6, and a selector 13 for selecting the result of the processing unit 5 or a result of the processing unit 12.

The instruction code 1 is inputted into the decoder 3, and the processing unit 5 is driven by a decoded result (by decoded instruction code 1). Similarly, the instruction code 2 is inputted into the decoder 4, and the processing unit 6 is driven by a decoded result (by decoded instruction code 2). The result of the processing unit 5 and the result of the processing unit 6 are inputted into the processing unit 12. The selector 13 selects a result outputted from the processing unit 12 or the result outputted from the processing unit 5. Results outputted from the selector 13 and the processing unit 6 are selected by the selector 7 and the selector 8 and are written into the register 9 or the register 10.

The selector 13 selects one result in response to the result of the register check circuit 11. The selectors 7 and the selector 8 select input data in response to the results analyzed by the decoder 3 and the decoder 4.

Next, operations of the processor in FIG. 1 are explained.

When the instruction code 1 designates that an operation result is written into the register 9 and the instruction code 2 designates that an operation result is written into the register 10, the result outputted from the processing unit 5 passes through the selector 13 and the selector 7 and is written into the register 9, and the result outputted from the processing unit 6 passes through the selector 8 and is written into the register 10.

In contrast, when the instruction code 1 designates that the operation result is written into the register 10 and the instruction code 2 designates that an operation result is written into the register 9, the result outputted from the processing unit 5 passes through the selector 13 and the selector 8 and is written into the register 10, and the result outputted from the processing unit 6 passes through the selector 7 and is written into the register 9.

Furthermore, when both the instruction code 1 and the instruction code 2 designate that the operation results are written into the register 9, the result outputted from the processing unit 5 and the result output from the processing unit 6 are inputted into the processing unit 12, and then results outputted from the processing unit 12 pass through the selector 13 and the selector 7 and are written into the register 9.

FIG. 8 is a table showing a sample of contents written into the register 9 and the register 10 in response to writing destination instructions by the instruction code 1 and the instruction code 2.

FIGS. 2, 3, 4, 5 and 6 are examples of operation processes of the processing unit 12.

Figure 2:
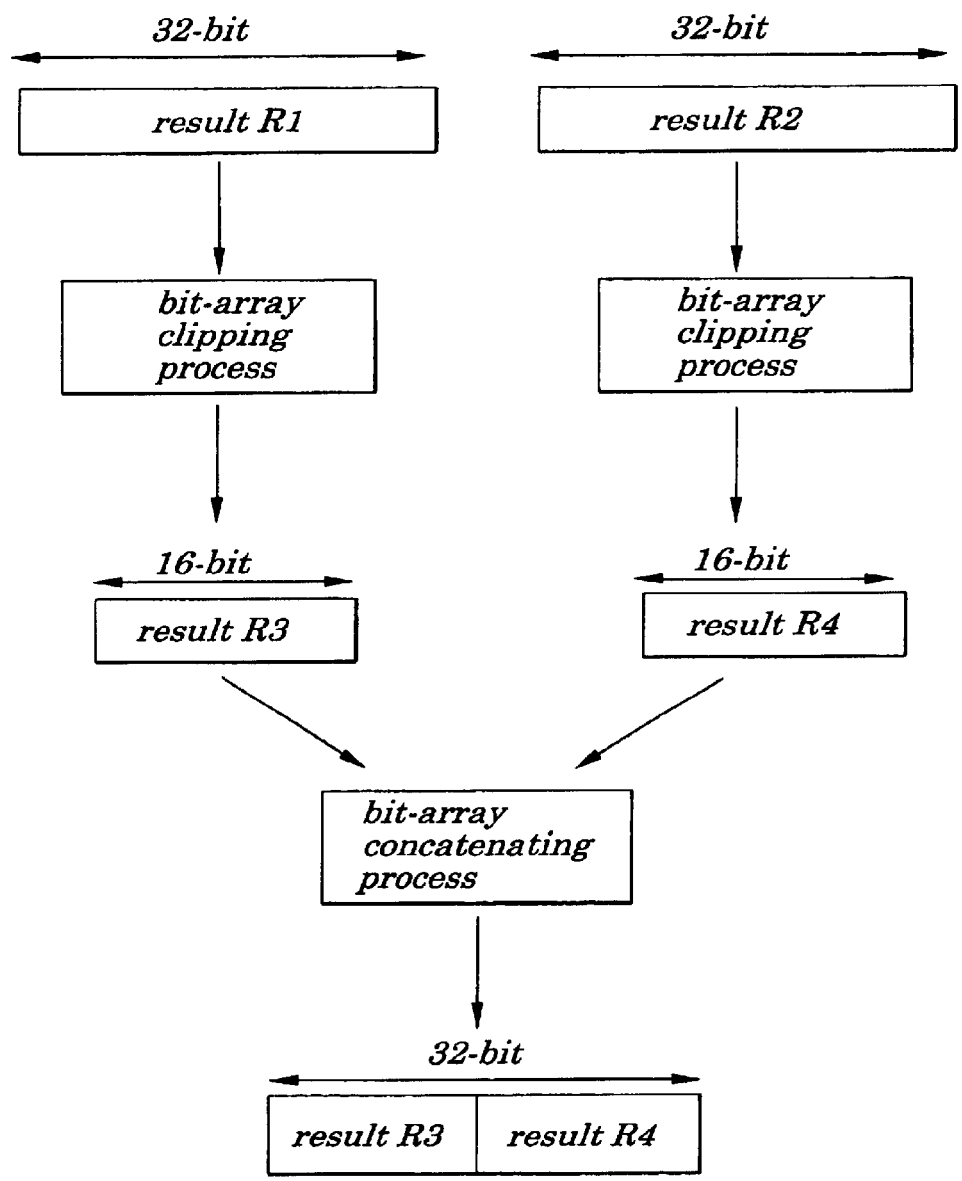
FIG. 2 is a flowchart showing a first operation sample of a processing unit 12.

FIG. 2 shows a simple bit-array clipping/concatenating process. For example, when each of results (result R1, result R2) of the processing unit 5 and the processing unit 6 includes 32-bits and each bit accuracy required to be stored among the 32-bits is 16-bit, required bit arrays are respectively clipped from the result R1 and the result R2 and then a result R3 and a result R4 of 16-bit-accuracy are produced.

The result R3 and the result R4 are concatenated, 32-bit data, which is a concatenated result, is outputted. With this operation, two operation results can be stored in one register. Therefore, register use efficiency can be improved, and process efficiency can be improved since a number of instructions for storing register values in a memory can be reduced.

FIG. 3 shows a rounding/concatenating process as another process example in the processing unit 12. For example, when each of the results (result R1, result R2) of the processing unit 5 and the processing unit 6 includes 32-bits, each of the results R1 and the result R2 is rounded to 16-bits and then a result R3 of 16-bit-accuracy and a result R4 of 16-bit-accuracy are produced.

The result R3 and the result R4 are concatenated, 32-bit data, which is a concatenated result, is outputted. With this operation, a process efficiency can be improved since the results can be rounded simultaneously, and the register use efficiency can be improved since two operation results can be stored in one register similarly to the processes in FIG. 2.

FIG. 4 shows an addition process as another process example in the processing unit 12. In this process, a 32-bit result obtained by adding two 32-bit operation results (result R1, result R2) is outputted. With this process, when a process like this is required, an addition process can be executed simultaneously. As a result, the process efficiency can be improved.

Figure 5:
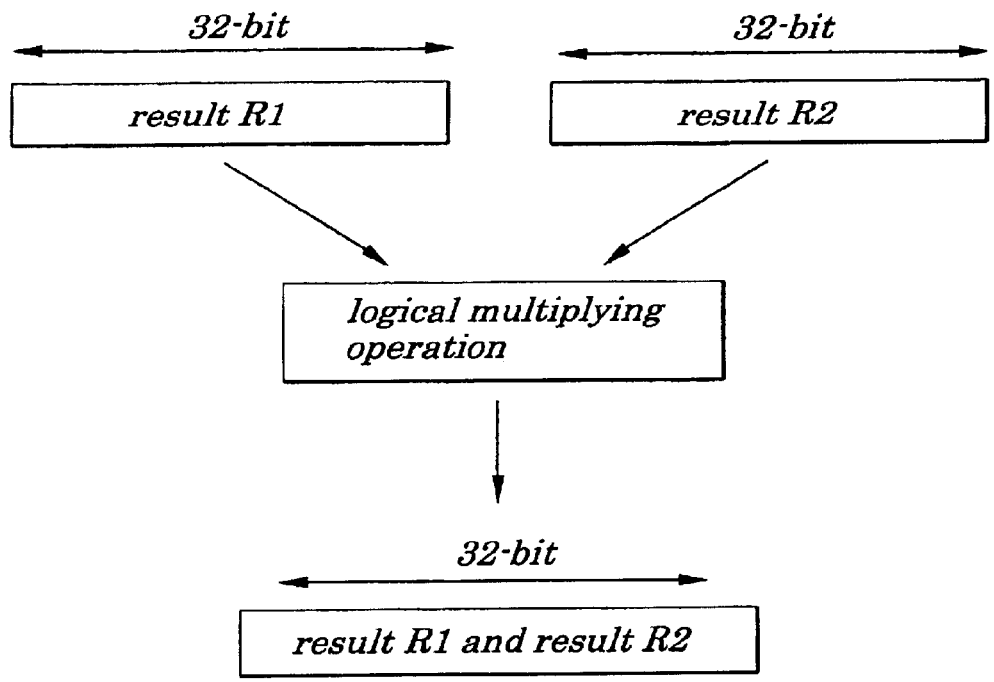
FIG. 5 is a flowchart showing a fourth operation sample of the processing unit 12.
Figure 6:
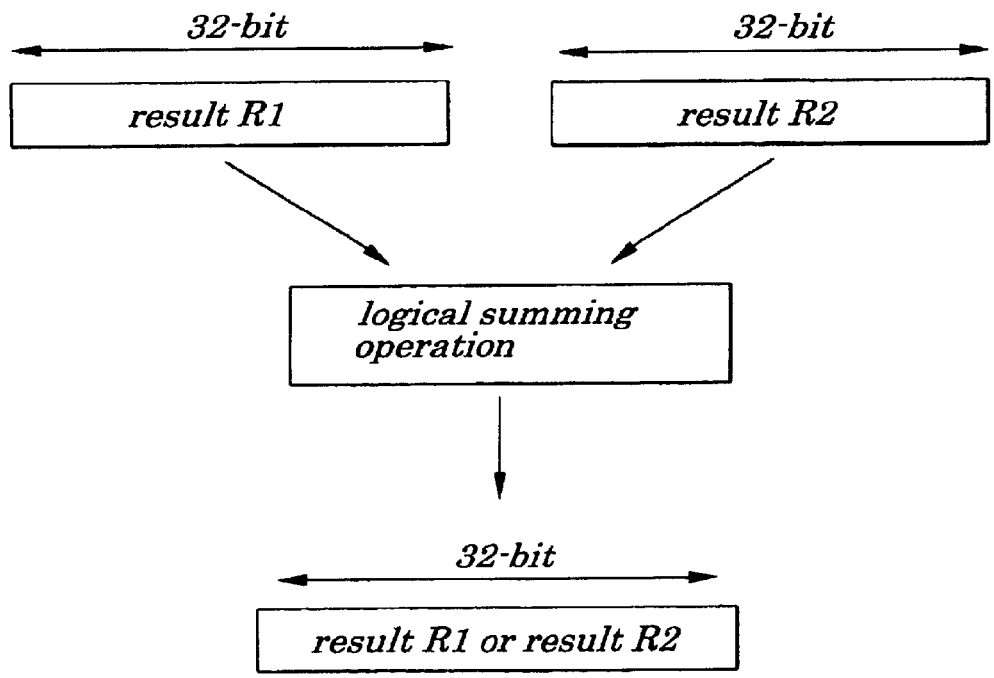
FIG. 6 is a flowchart showing a fifth operation sample of the processing unit 12.

FIG. 5 shows a logical multiplying operation as another process example in the processing unit 12. FIG. 6 shows a logical summing operation as another process example in the processing unit 12. In these processes, when processes like these are required, the logical multiplying process or the logical summing process can be executed simultaneously. As a result, the process efficiency can be improved.

Figure 7:
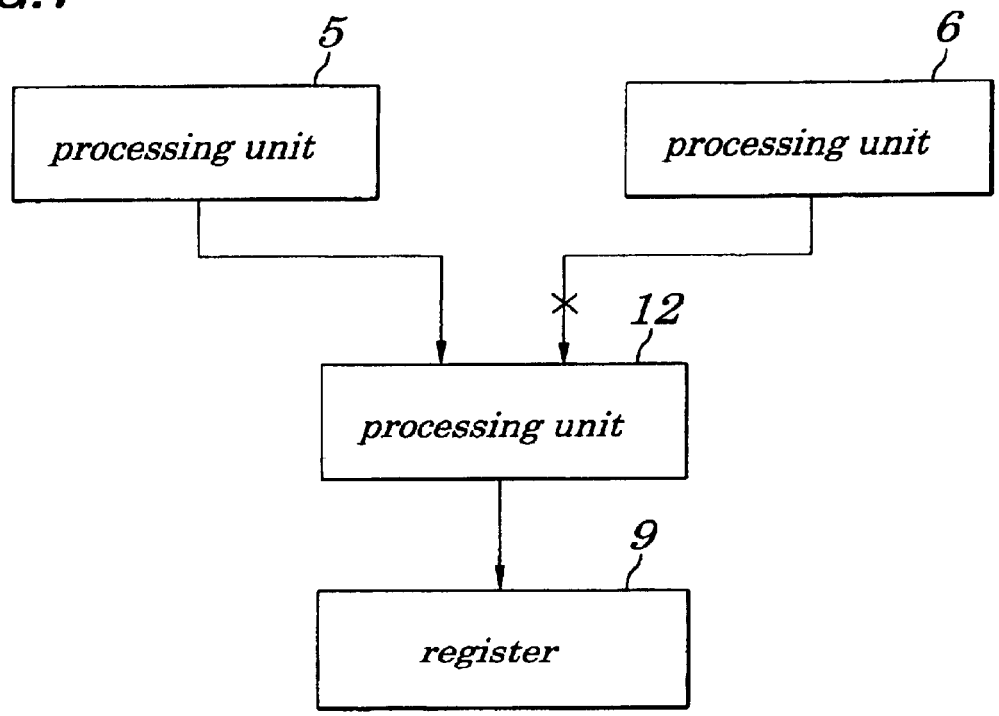
FIG. 7 is a block diagram showing an action of the processor according to the first embodiment of the present invention when writing-destination-registers are identical.

FIG. 7 shows an operation of the processor when writing-destination-registers are identical in the processor according to this embodiment. Only when resisters as writing destinations are identical, the result of the processing unit 12 into which the results of the processing unit 5 and the processing unit 6 are inputted is written into the register 9.

Second Embodiment

Figure 9:
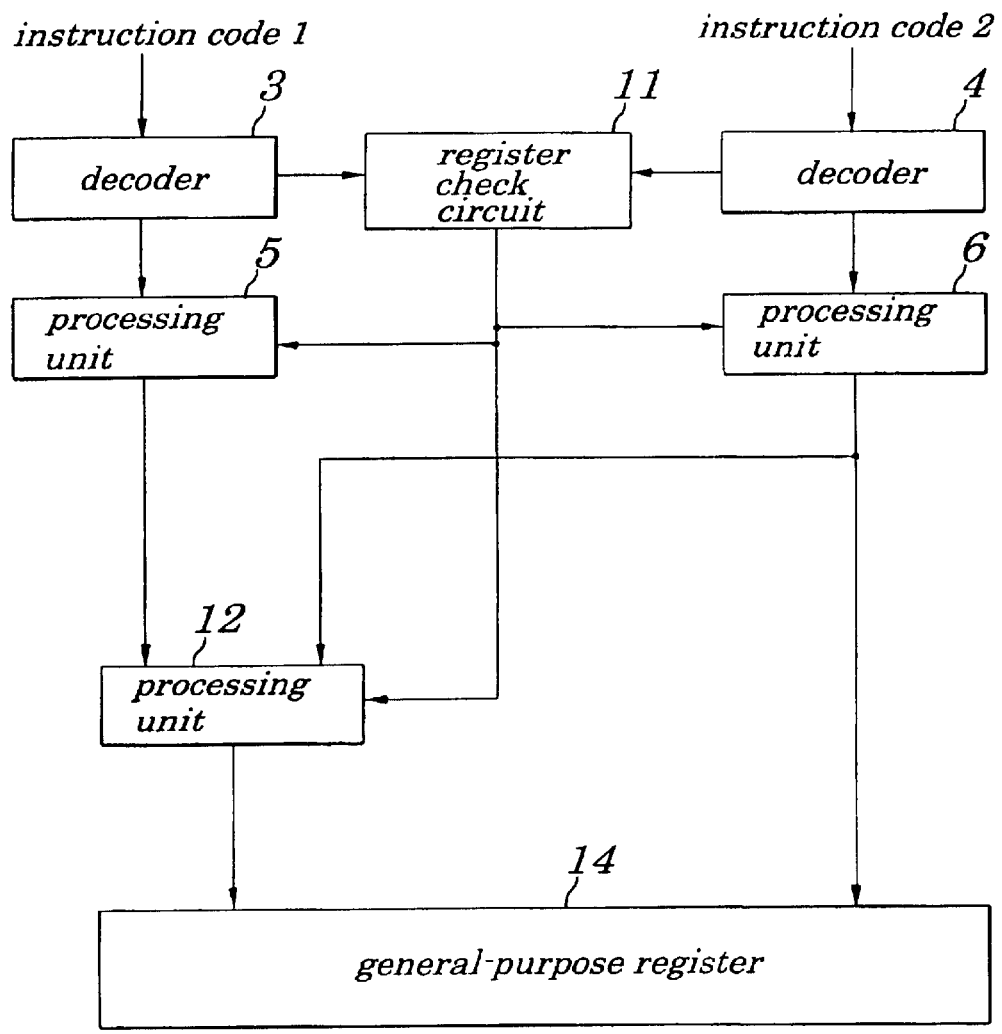
FIG. 9 is a block diagram showing a processor according to a second embodiment of the present invention.

Further, a second embodiment according to the present invention will be described. FIG. 9 is a block diagram showing a processor according to the second embodiment of the present invention.

As shown in FIG. 9, the processor according the second embodiment of the present invention differs from a processor of the first embodiment shown in FIG. 1 in that a coincidence signal generated in a register check circuit 11 is inputted into the processing unit 5 and the processing unit 6. A general-purpose register 14 (shown in FIG. 9) is more general than the selector 7 and the selector 8 and the register 9 and the register 10 (shown in FIG. 1). When resister numbers are identical and the coincidence signal becomes active, the processing unit 5 and the processing unit 6 change types of operations.

Results of the processing unit 5 and the processing unit 6 are inputted into a processing unit 12, and then one operation result is outputted from the processing unit 12 and is written into a register of a designated register number in a general-purpose register 14. In this case, the coincidence signal is inputted into the processing unit 5 and the processing unit 6 and an operation can be performed with processing resources of the processing units 5, 6 when designated registers are identical. Therefore, it is possible to carry out to reduce a number of transistors and to execute processes at a higher speed in comparison with the processor of the first embodiment.

Figure 10:
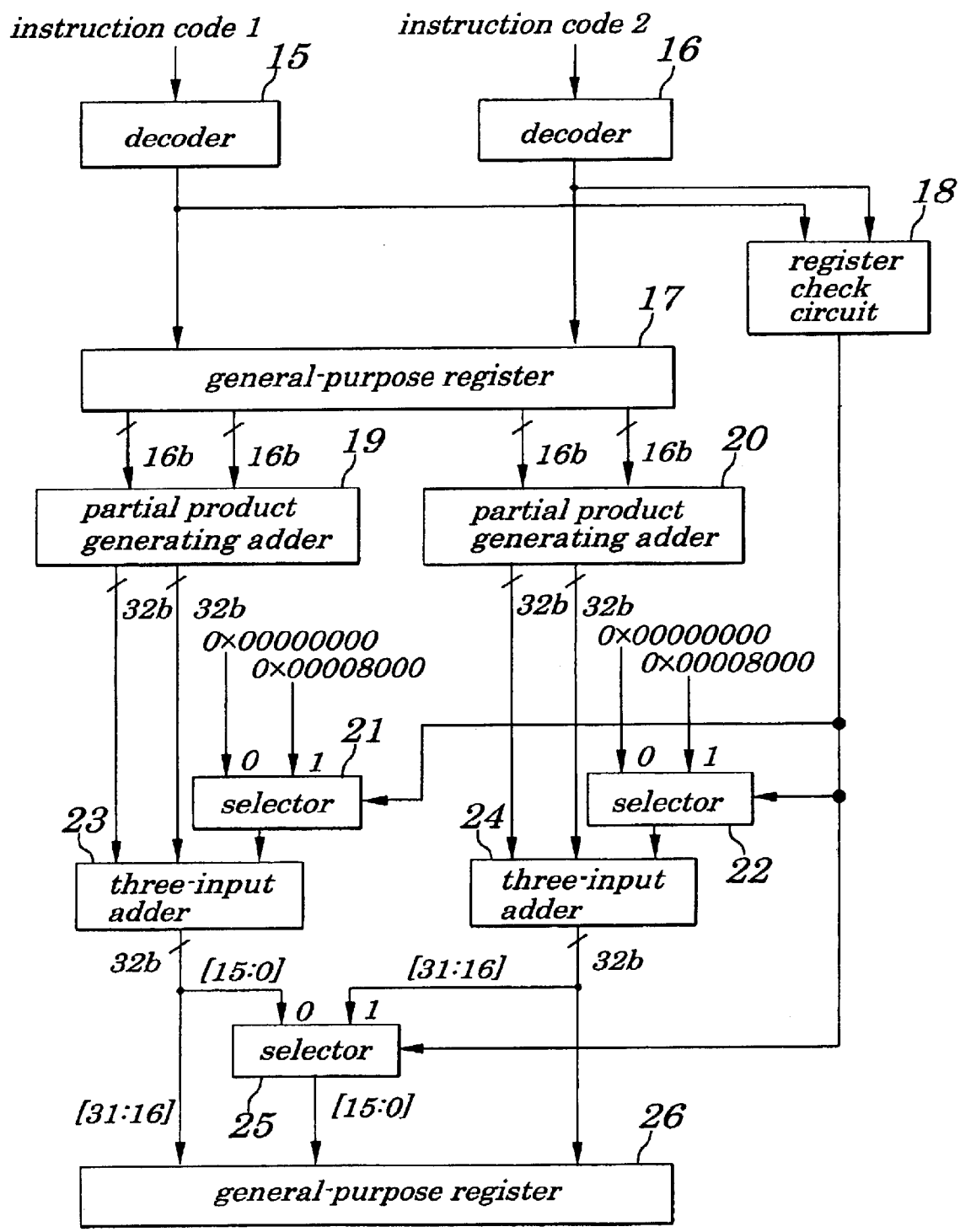
FIG. 10 is a block diagram showing a concrete example of the processor according to the second embodiment of the present invention.
Figure 11:
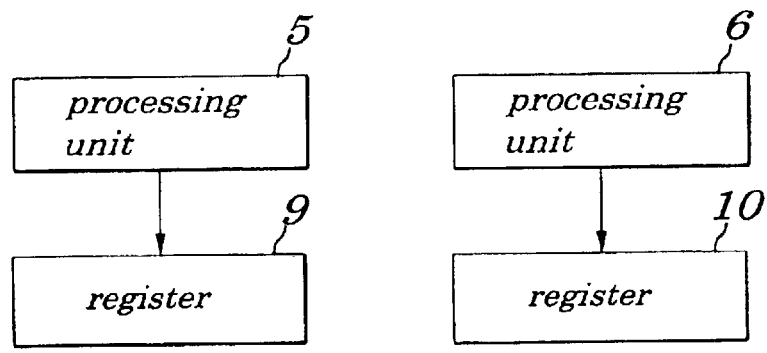
FIG. 11 is a block diagram showing an action of a conventional processor when writing-destination-registers are not identical in the conventional art.
Figure 12:
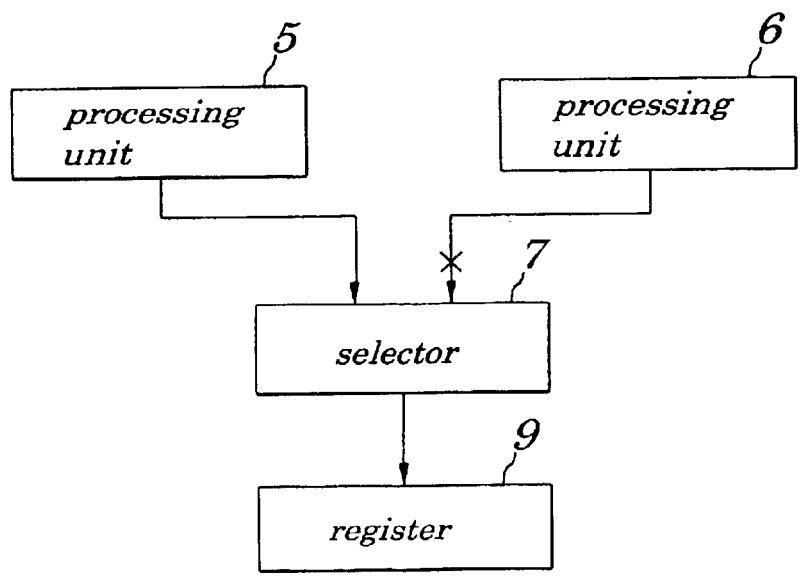
FIG. 12 is a block diagram showing an action of the conventional processor when writing-destination-registers are identical in the conventional art.
Figure 14:
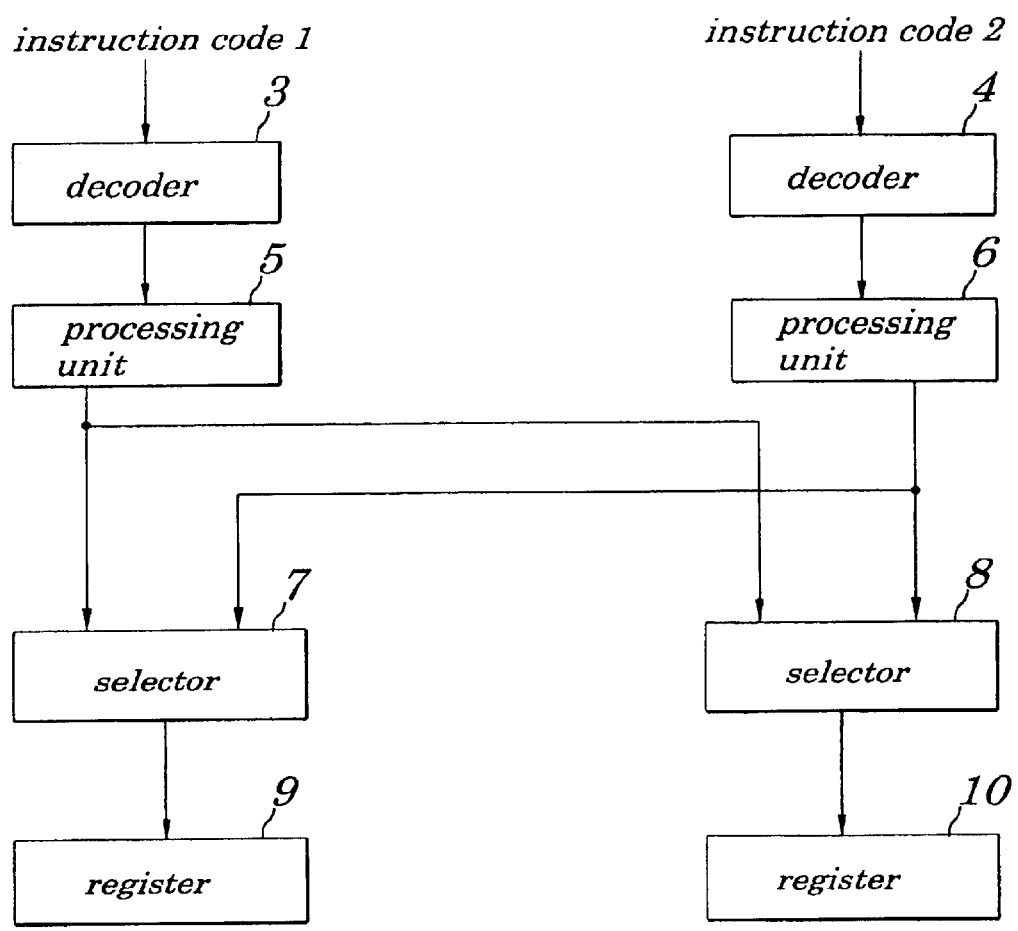
FIG. 14 is a block diagram showing a conventional processor.

FIG. 10 shows a more concrete example of the second embodiment in FIG. 9. For example, in FIG. 10, the processing unit 12 (shown in FIG. 1) executes the rounding/concatenating processes similarly to the processes (shown in FIG. 3) to reduce the number of transistors and to executes operations at high speed.

A multiplication unit usually includes a partial product generating adder and a final adder. In FIG. 10, a partial product generating adder 19, a partial product generating adder 20, a three-input adder 23 and a three-input adder 24 configures to two multiplication units.

A three-input adder is an adder for adding three values, for example, is an adder in which one step (a carry-save-adder) is added to a normal adder. In this three-input adder, the number of transistors and a delay time considerably decrease.

In FIG. 10, when writing destination registers are identical and a coincidence signal is outputted from a register check circuit 18, values outputted from a selector 21 and a selector 22 are 0x00008000, and these values (0x00008000) are inputted into the three-input adder 23 and the three-input adder 24 and are added with partial product addition values outputted from the partial product generating adder 19 and the partial product generating adder 20. With this addition, low-order 16-bits values are rounded. A high-order 16-bits value of the three-input adder 23 and a high-order 16-bits value of the three-input adder 24 are concatenated and then a concatenated value is written in a general-purpose register 26, therefore, it is possible to write two results in one register in a state that lower-order 16-bits of two multiplying results are rounded.

With this operation, it is possible to write two results in one register, therefore, it is possible to carry out an improvement, in a register use efficiency.

As above described, a first effect of the present invention is that the register use efficiency can be improved.

As its causes, since two, operation results can be stored in one register, a number of registers for storing results can be reduced.

A second effect of the present invention is that a process efficiency can be improved.

As its causes, since two results are stored in one register, a number of storing instructions required to store values of the register into a memory is reduced.

It is thus apparent that the present invention is not limited to the above embodiments but may be changed and modified without departing from the scope and spirit of the invention.

Finally, the present application claims the priority based on Japanese Patent Application No. Hei11-177838 filed on Jun. 24,1999, which is herein incorporated by reference.

What is claimed is:

1. A processor executing plural instructions simultaneously, wherein register numbers of said plural instructions to be executed simultaneously are compared, kinds of operations to be executed by said plural instructions are changed in response to a comparison result, wherein said register numbers to be compared are writing-destination register numbers, and wherein when said writing-destination register numbers of said plural instructions to be executed simultaneously are identical, a constant operation is applied to plural operation results obtained from said plural instructions to obtain an operation result and said operation result is written into a writing-destination register instructed by said plural instructions.

2. The processor according to claim 1, wherein said operation result is obtained by concatenating plural parts of said plural operation results.

3. The processor according to claim 1, wherein said operation result is obtained by rounding said plural operation results and concatenating plural parts of plural rounded operation results.

4. The processor according to claim 1, wherein said operation result is obtained by adding said plural operation results.

5. The processor according to claim 1, wherein said operation result is obtained by logical summing of said plural operation results.

6. The processor according to claim 1, wherein said operation result is obtained by logical multiplying of said plural operation results.

* * * * *

UNITED STATES PATENT AND TRADEMARK OFFICE
CERTIFICATE OF CORRECTION

PATENT NO. : 6,757,813 B1
DATED : June 29, 2004
INVENTOR(S) : Igura

It is certified that error appears in the above-identified patent and that said Letters Patent is hereby corrected as shown below:

<u>Title page,</u>
Item [57], ABSTRACT,
Line 2, "writin" should be -- writing --.

Signed and Sealed this

Fourth Day of January, 2005

JON W. DUDAS
*Director of the United States Patent and Trademark Office*